United States Patent [19]

Cardoza

[11] Patent Number: 5,588,132
[45] Date of Patent: Dec. 24, 1996

[54] METHOD AND APPARATUS FOR SYNCHRONIZING DATA QUEUES IN ASYMMETRIC REFLECTIVE MEMORIES

[75] Inventor: Wayne M. Cardoza, Amherst, N.H.

[73] Assignee: Digital Equipment Corporation, Maynard, Mass.

[21] Appl. No.: 326,682

[22] Filed: Oct. 20, 1994

[51] Int. Cl.$^6$ .................................................. G06F 13/14
[52] U.S. Cl. .................... 395/475; 395/468; 395/200.08; 395/874; 395/881; 395/489
[58] Field of Search ..................................... 395/446, 457, 395/475, 474, 468, 881, 200.01, 200.03, 874, 200.08

[56] References Cited

U.S. PATENT DOCUMENTS

| | | | |
|---|---|---|---|
| 4,991,079 | 2/1991 | Dann | 395/200.08 |
| 5,117,350 | 5/1992 | Parrish et al. | 395/401 |
| 5,146,607 | 9/1992 | Sood et al. | 395/800 |
| 5,255,369 | 10/1993 | Dann | 395/200.08 |
| 5,313,638 | 5/1994 | Ogle et al. | 395/726 |

OTHER PUBLICATIONS

C. Maples, A High–Performance Memory–Based Interconnection Sytem for Multicomputer Environments, Supercomputing '90, pp. 295–304 May 1990.

P. Magnusson et al., Queue Locks on Cache Coherent Multiprocessors, Parallel Processing, 1994 Symposium, pp. 165–171 Jun. 1994.

G. Graunke et al., Synchronization Algorithms for Shared–Memory Multiprocessors, Computer Magazine, pp. 60–69 Jun. 1990.

G. Hermannsson et al., Optimistic Synchronization in Distributed Shared Memory, Distributed computing Systems, 1994 International Conference, pp. 345–354 1994.

T. Anderson, The Performance of Spin Lock Aternatives for Shared–Memory Multiprocessors, IEEE Transaction on Parallel and Distributed Sysytems, pp. 6–16 Jan. 1990.

R. Wisniewski et al., Scalabel Spin Locks for Multiprogrammed Systems, Parallel Processing, 1994 Symposium, pp. 583–589 1994.

*Primary Examiner*—Eddie P. Chan
*Assistant Examiner*—Hong Kim
*Attorney, Agent, or Firm*—Dirk Brinkman

[57] ABSTRACT

A network of processors synchronize modification of a common data structure stored in an asymmetric reflective memory by using a queue. A first processor stores a queue element in a global write-only address space of the reflective memory, the reflective memory to copy the queue element to a local read/write address space of a second processor. The first processor also stores a queue header in the global write-only address space. In response to detecting the queue element, the second processor reads the queue header and then overwrites the queue header with a zero. The reading and writing of the queue header are performed atomically in the local read/write address space of the second processor. The second processor processes the queue element, and marks the queue element as processed in the global address space of the reflective memory.

7 Claims, 9 Drawing Sheets

PRIOR ART

METHOD AND APPARATUS FOR SYNCHRONIZING DATA QUEUES IN ASYMMETRIC REFLECTIVE MEMORIES

FIELD OF THE INVENTION

The invention relates to networked processors using reflective memories to share information, and more particularly to synchronizing queues in the reflective memories.

BACKGROUND OF THE INVENTION

In the past, multiple central processing units have been networked to increase the throughput of computer systems. Shared memories have been used to permit the networked processors to access common data structures. One problem presented by the use of networked processors is synchronizing changes to the common data structures. Synchronizing changes tends to introduce delays due to contention and timing constraints.

The common data structures have frequently been implemented as queues. In a queue, a queue header is used to store an address of a first queue element, the first element stores an address of a next queue element, and so forth, to produce a linked list of elements. Each element of the queue can include data to be shared among the networked processors. Synchronization has been required while elements are added and removed from the queue, since any of the processors can potentially change the queue.

The synchronization could be explicitly performed by using a synchronization variable to indicate that the queue is being modified. However, this would be a relatively expensive operation involving additional memory accesses and possibly complex synchronization protocols.

It is desired to synchronize the adding and removing of elements of queues stored as a common data structure in reflective memories concurrently accessed by networked computers without introducing additional delays in the operation of the computer system.

SUMMARY OF THE INVENTION

A network of processors synchronize modification of a common data structure stored in an asymmetric reflective memory connected to the processors. The synchronization is effected by using a queue. In an asymmetric reflective memory, data written to a global write-only address space can be selectively reflected, e.g. copied, to a local read/write address space of each processor in the network. Atomic read/write operations can only be guaranteed for the local address space. In an atomic operation, either, the read and the write operation are both performed, or neither are performed.

The queue includes a queue header and queue elements. The header addresses the first queue element, and each subsequent queue element is addressed by the previous queue element. Processing activities are synchronized by means of data communicated by the queue elements. An unprocessed queue element is designated as valid, and a processed queue element is designated as invalid. To add a queue element, a first processor stores a queue element in a global write-only address space of the reflective memory. The reflective memory copies the queue element to a local read/write address space of a second processor. The first processor also stores a queue header in the global write-only address space. The queue header addresses the queue element.

In response to detecting the queue element, the second processor reads the queue header and then overwrites the queue header with a zero. The reading and writing of the queue header are performed atomically in the local read/write address space of the second processor. That is, the changes made to the queue header are only visible to the second processor. The first processors continues to view the queue header as addressing the queue element, and not storing a zero. The second processor processes the queue element using a local copy of the queue header, and marks the queue element as processed in the global address space of the reflective memory.

DETAILED DESCRIPTION OF A PREFERRED EMBODIMENT

Figure 1:
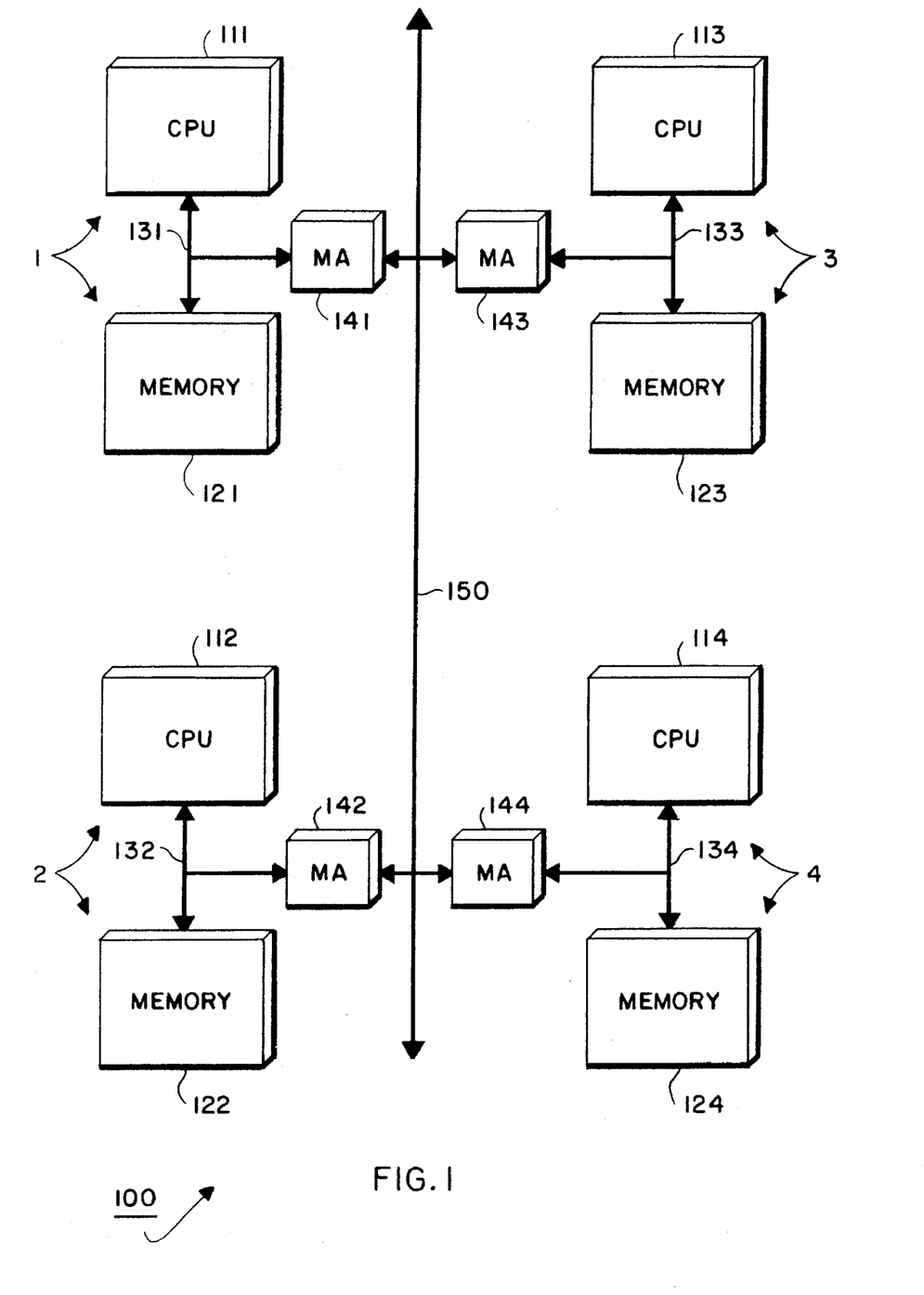
FIG. 1 is a block diagram of a computer system including asymmetrically accessed reflective memory.

FIG. 1 shows a computer system 100 including networked central processing units (CPU) 111–114 connected to memories 121–124 by input/output buses 131–134 as a cluster of nodes 1–4. Each of the nodes 1–4 includes a CPU and a memory. The memories 121–124 are configured as a reflective memory by adapters (MA) 141–144 and a memory bus 150. The memory bus 150 provides a direct connection between a virtual memory address space of one node, and a virtual memory address space of another node. As will be described in further detail below, read and write access to the reflective memory is asymmetric.

To establish a network connection between nodes, a first node allocates a portion of virtual address space as shared memory. The other nodes in the cluster can then use their respective adapters and local direct access memory maps to establish a local connection between the allocated virtual address space of the first node and the virtual address space of the local node.

Figure 2:
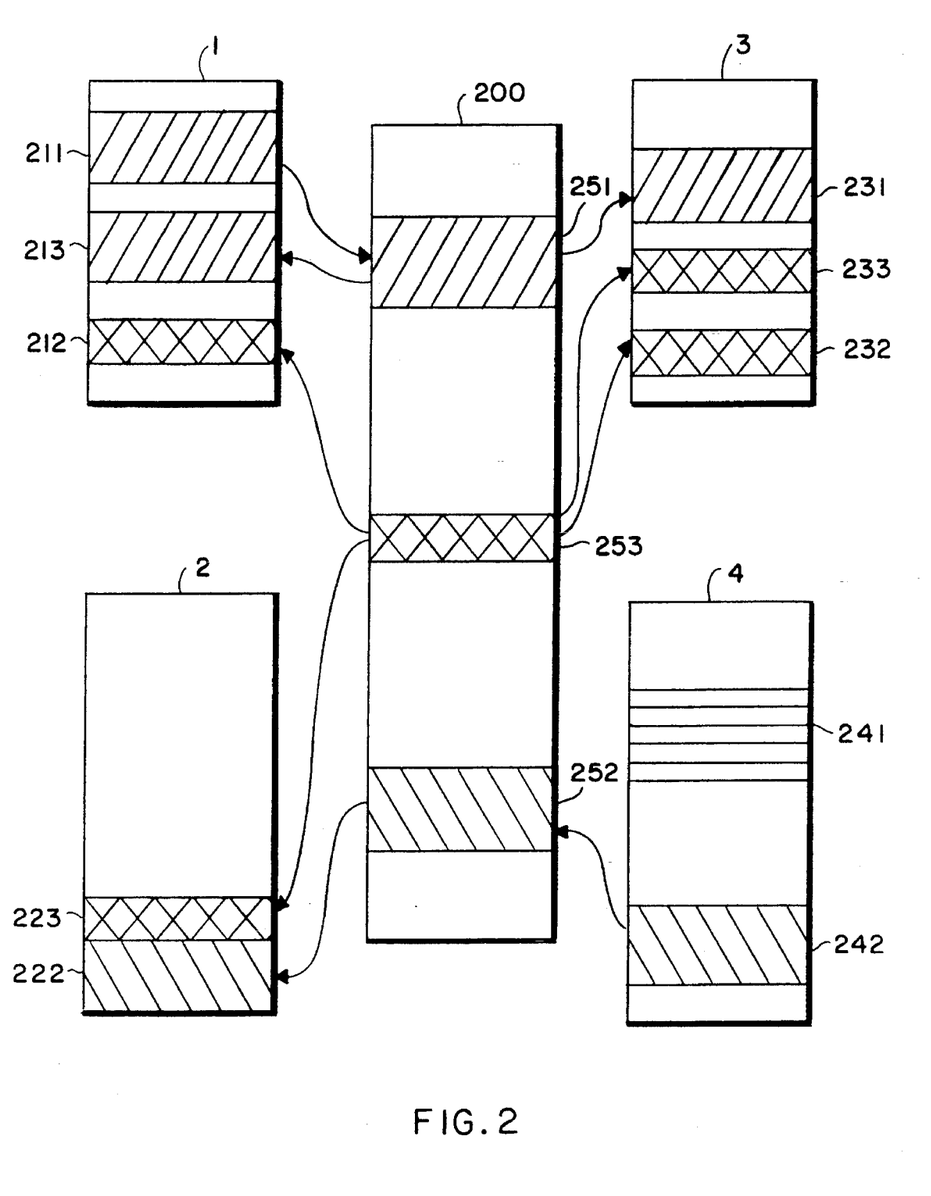
FIG. 2 is a block diagram of the address space of the reflective memory of FIG. 1.

FIG. 2 shows that the adapters and the memory bus of FIG. 1 support both point-to-point and broadcast communications. The portions of address space allocated for shared access are shown hashed in FIG. 2. For example, in FIG. 2, a global virtual address space 200 can by addressed by any of the nodes 1–4 connected to the memory bus 150. By using the adapters 141–144 and the memory bus 150, any of the CPUs 111–114 can write data into the address space of another CPU.

For example, data written to address space 211 of node 1, as reflected in the global virtual address space 251, will also be stored in address space 231 of node 3. The data can also be reflected back to address space 213 of node 1. In other words, address space 211 of node 1 is mapped to be global write-only address space. Address spaces 213 and 231 are a local read/write mapping of the global address space 251. Data written to address space 242 of node 4 becomes visible in address space 222 of node 2 via global address space 252. Note, in this example, node 4 does not have a local read/write mapping of the global write-only address space 252.

Data written to the global write-only address space 232 of node 3 appears in both node 1 and node 2 at local read/write address spaces 212 and 223, respectively, after broadcast through global address space 253 of the memory bus 150. Node 3 also has a local react/write address space 233 to store the data written to space 232.

This ability of the nodes 1–4 to communicate with each other through a direct manipulation of the shared virtual address space 200 is a major reason that systems with reflective memories have lower latencies than computer systems using other networking schemes.

However, in an asymmetrical reflective memory, as shown in FIGS. 1 and 2, access is not fully shared among all of the nodes. Writes of data to the virtual address space of a node can be either global or local. A global write transmits the data to all nodes which are mapped to the allocated virtual address space. A local write stores the data only in the node issuing the write.

Thus, it is possible for one node to globally broadcast changes made to a common data structure, while another node makes purely local changes to the common data structure. Global changes are effected by storing data at global addresses which are write-only and reflecting the data to local read/write addresses mapped to the global addresses. Local changes are made to data stored at local addresses which allow both reads and writes. Therefore, all data which are read must eventually be stored in a local address space.

It is this asymmetry in read and write accesses which inhibits global atomic read-modify-write operations which have traditionally been used to ensure the integrity of common data structures. In an atomic operation, either all, or none of the sub-steps, e.g., read, modify, and write, of the operation are performed. In the asymmetric reflective memory of FIGS. 1 and 2, global atomic operations are not possible. That is, read-modify-write operation to multiple nodes will not necessarily produce an identical data structure in all of the nodes. In an asymmetric reflective memory, atomicity of operations can only be guaranteed locally within the node issuing the atomic operation.

The problems caused by the asymmetry of reads and writes, and the inability to perform globally atomic read-modify-write operations could be solved by explicit synchronizing techniques. However, explicit synchronizing techniques are notoriously slow, and possibly require complex synchronization protocols. This problem appears in the management of queues which are frequently used in computer systems to communicate data between networked nodes sharing data structures.

Figure 3A:
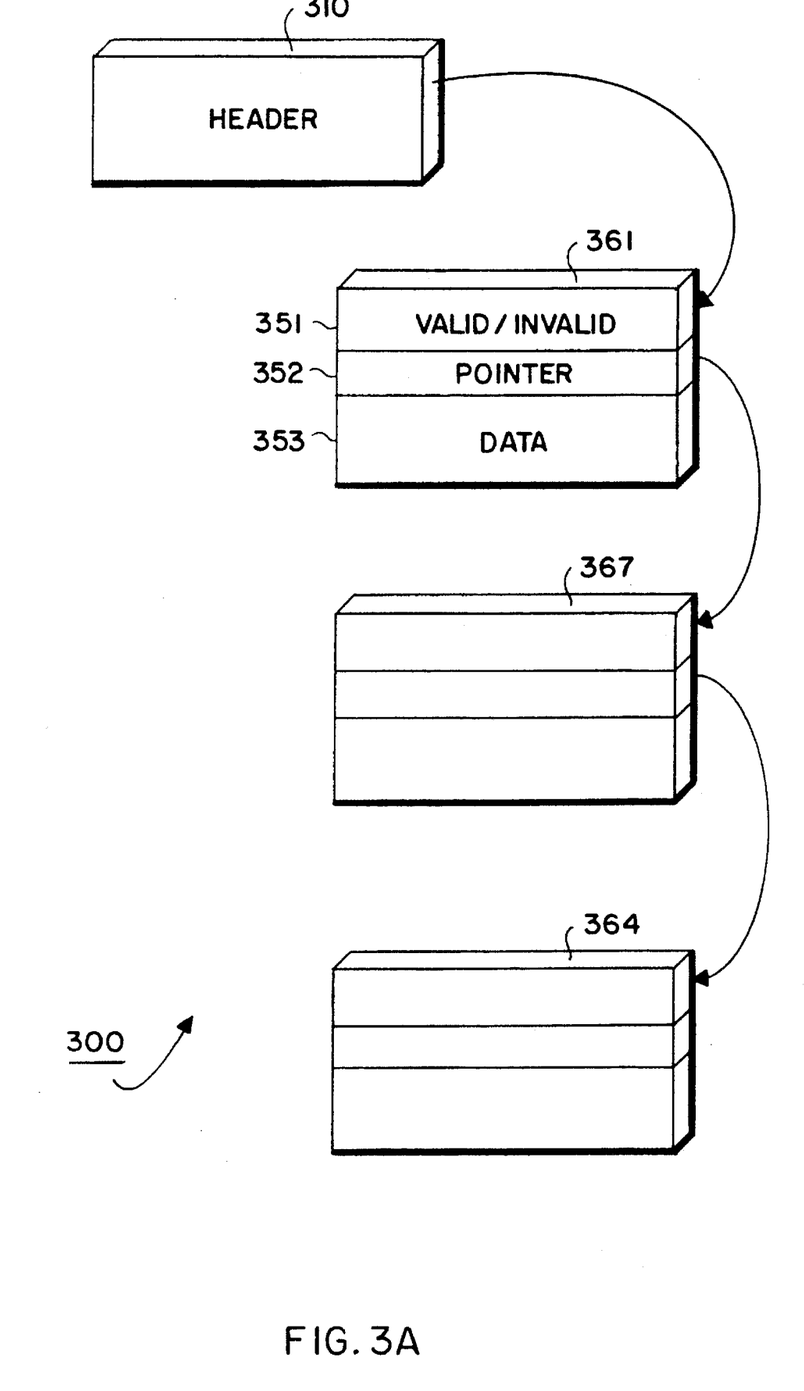
FIG. 3A is a block diagram of a queue stored as a common data structure in the reflective memory of FIG. 2.

FIG. 3A shows a common queue 300 for sharing data among the nodes 1–4. The queue 300 includes a header 310 and queue elements 361, 367, and 364. Each queue element includes a valid field 351, a pointer field 352, and a data field 353. The header 310 includes a pointer, e.g. address, to the first element 361 of the queue 300. Each subsequently linked element includes a pointer 352 pointing to the next element of the queue.

The valid/invalid field 351, for each queue element, indicates whether or not the data stored in the element are valid or invalid. If the data of the element are valid, the data have not yet been processed. If the data are invalid, the data have been processed, and the element is available for re-use.

During operation of the computer system 100 of FIG. 1, a first node wishing to communicate with a second node creates a queue element to be added to the queue 300. The element is marked valid in the valid/invalid field 351 and added to the queue. The second node monitoring the queue 300, in response to detecting the appearance of the valid element, processes the element. After the element has been processed, it is marked as invalid.

Figure 3B:
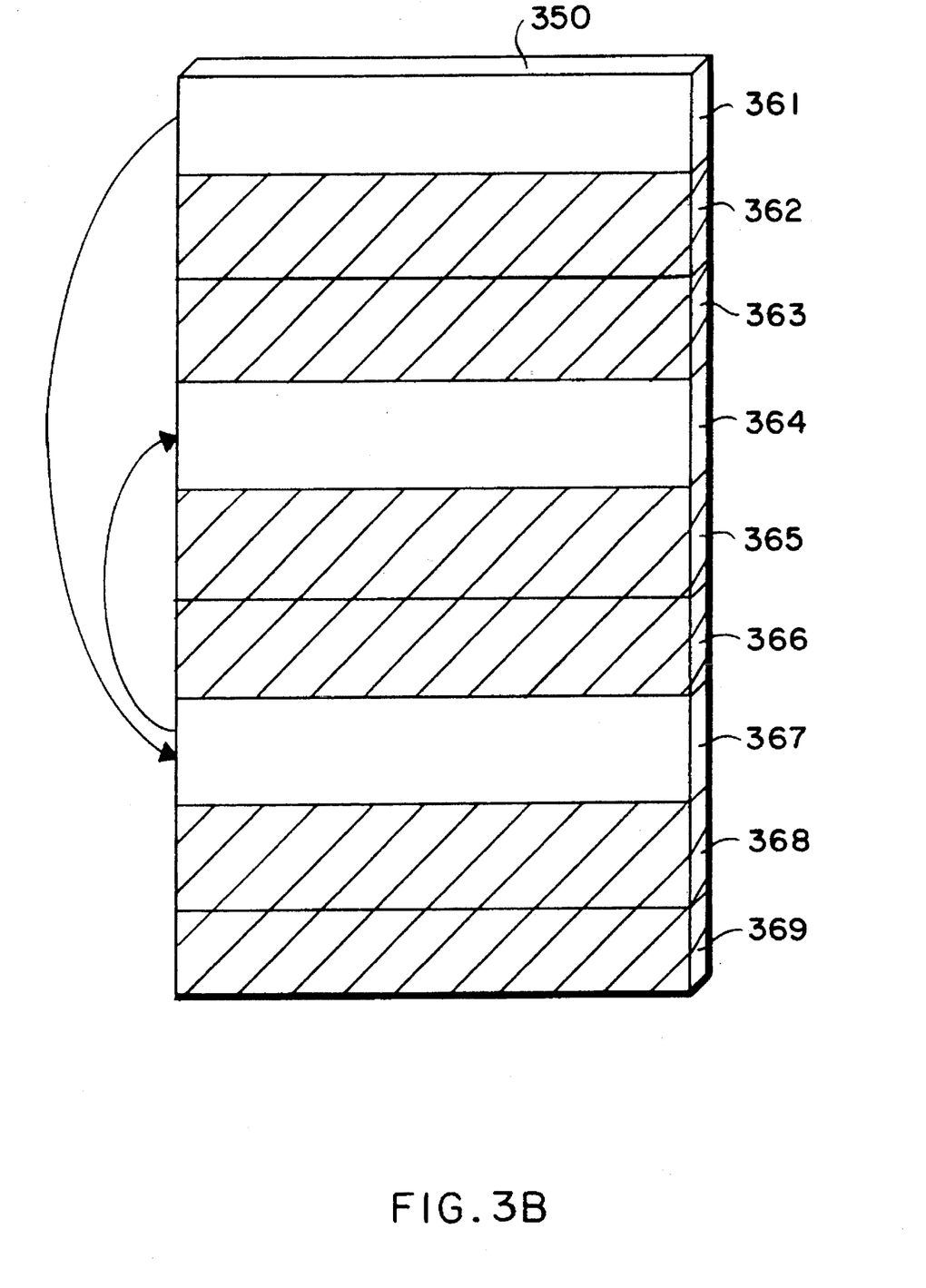
FIG. 3B is a block diagram of allocable queue elements for the queue of FIG. 3A.

As shown in FIG. 3B, the queue elements can be allocated as a portion 350 of the global virtual address space 200 of FIG. 2. For example, the portion 350 includes allocable elements 361–369. The crosshatched elements are available for allocation, and the elements 361, 364, and 367 are linked to the queue 300 of FIG. 3A, as shown by the directed arrows.

The asymmetry problem appears when the queue 300 is to be modified, for example, globally to add an additional element, keeping in mind, that in an asymmetrical reflective memory, global atomic read-modify-write operations are not possible.

Figure 4:
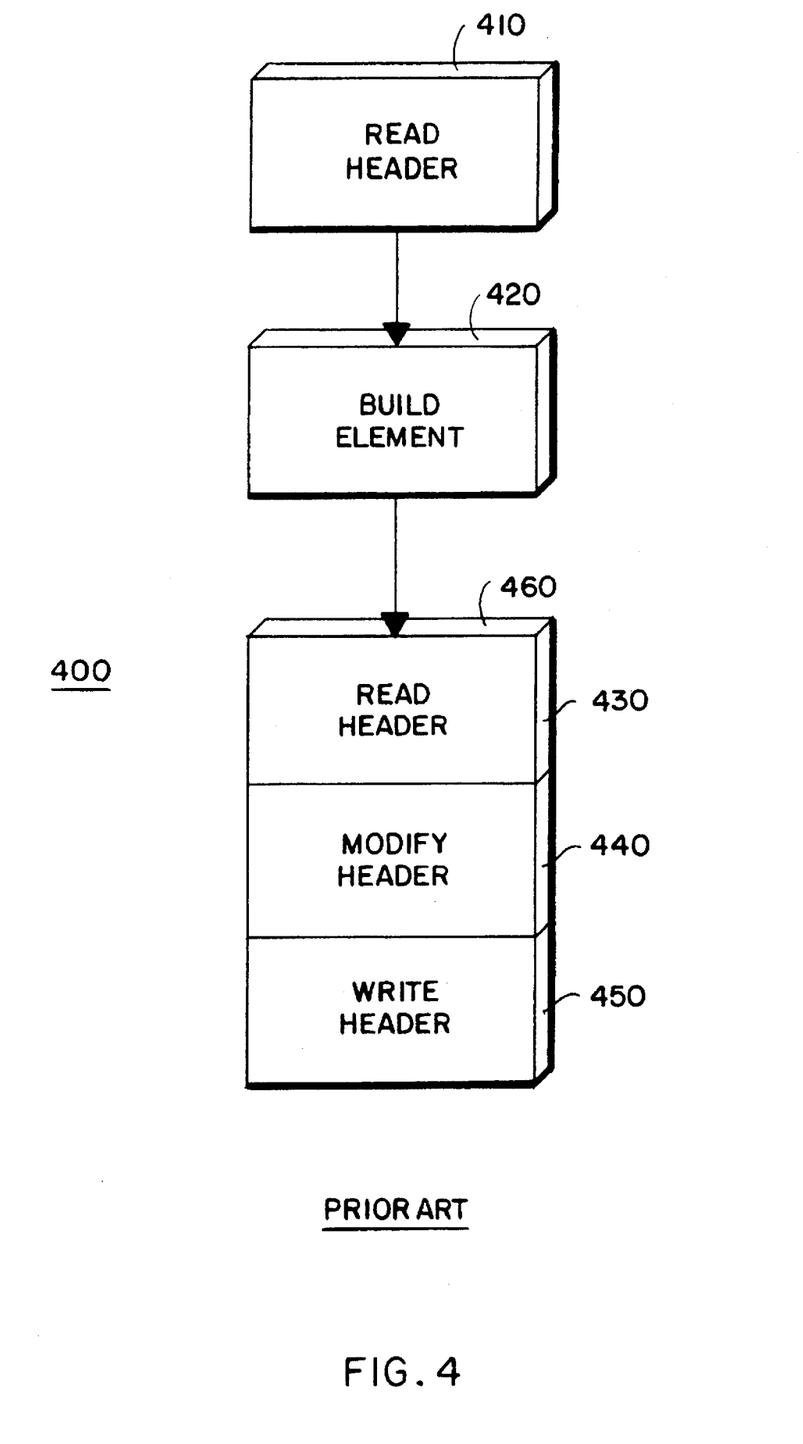
FIG. 4 is a flow diagram of a prior art procedure for adding an element to the queue of FIG. 3A.
Figure 5:
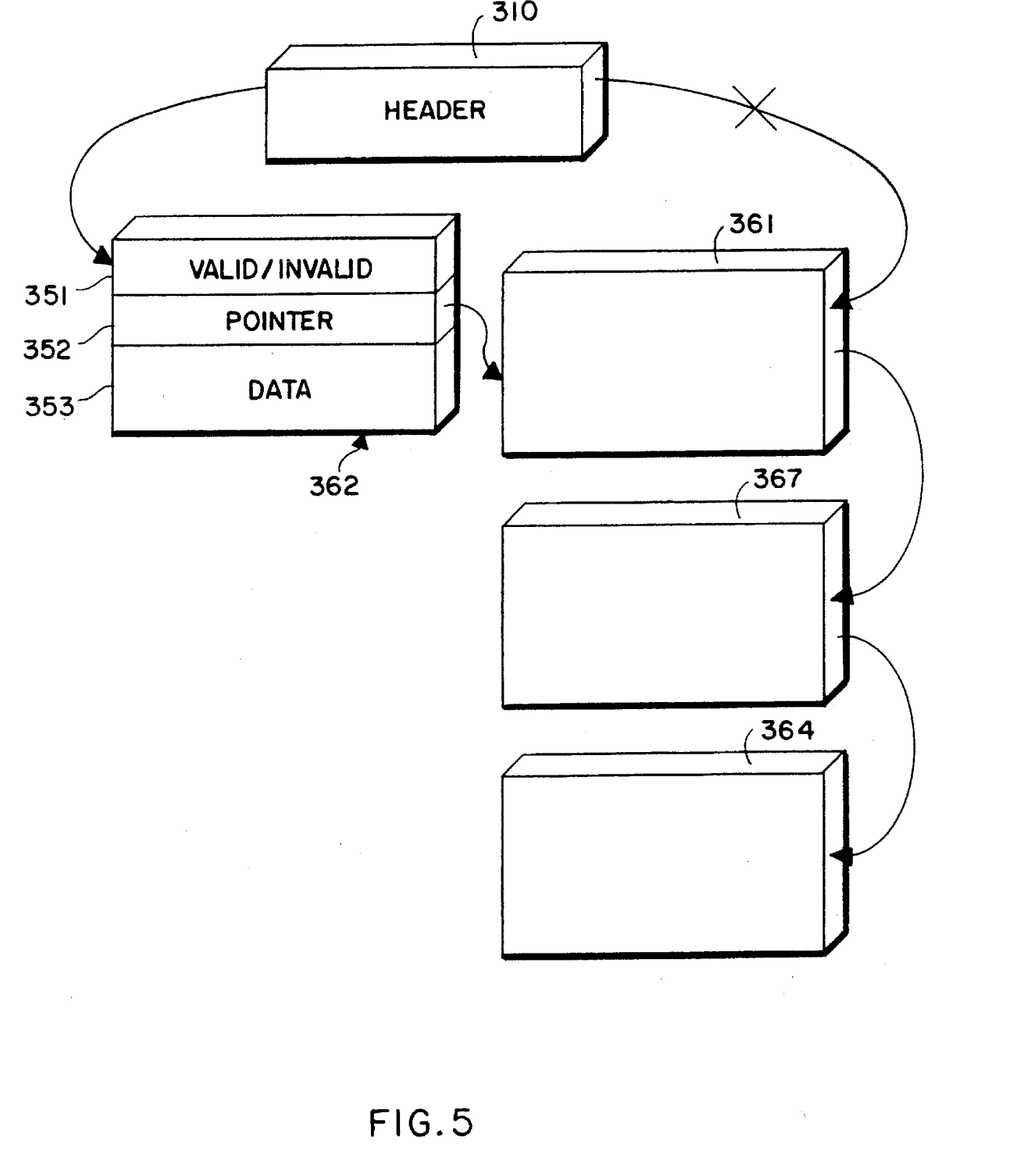
FIG. 5 is a block diagram of the queue showing the element added by the procedure of FIG. 4.

FIG. 4 shows a process 400 which should be used to add a new element to the queue 300, as shown in FIG. 5. In step 410, the header 310 is read to determine the address of the first element 361 of the queue. In step 420, a new element 362 is allocated, and the new element 362 is constructed.

The pointer field 352 of the new element 362 stores the address read in the header 310. The valid/invalid field 351 and the data field 353 are build appropriately. After, the new element 362 is constructed, the header 310 is modified to link the new element 362 into the queue 300. This re-linking of the header 310 from the first element 361 to the new element 362 is indicated by the "X" in FIG. 5. In order to ensure that the header 310 will not be modified by other nodes while linking the new element 362, a global atomic operation 460, including read-modify-write steps 430, 440, and 450 should be performed. However, in an asymmetrical reflective memory, this is not possible.

According to the present invention, a technique is disclosed which admits modifications of the common data structure represented by the queue 300 without the ability to perform global atomic read-modify-write operations while ensuring the integrity of the common data structure. Furthermore, the inventive technique modifies the queue without using costly explicitly synchronization protocols.

In the technique of the present invention, all modifications made to the queue 300 by nodes adding elements to the queue are made globally. The addition of the new elements is therefore visible to all nodes sharing the queue. However, node processing elements modify the queue 300 asymmetrically. That is, the header 310 is only modified locally, while the elements, and particularly the valid/invalid field 351 are modified globally.

Figure 6:
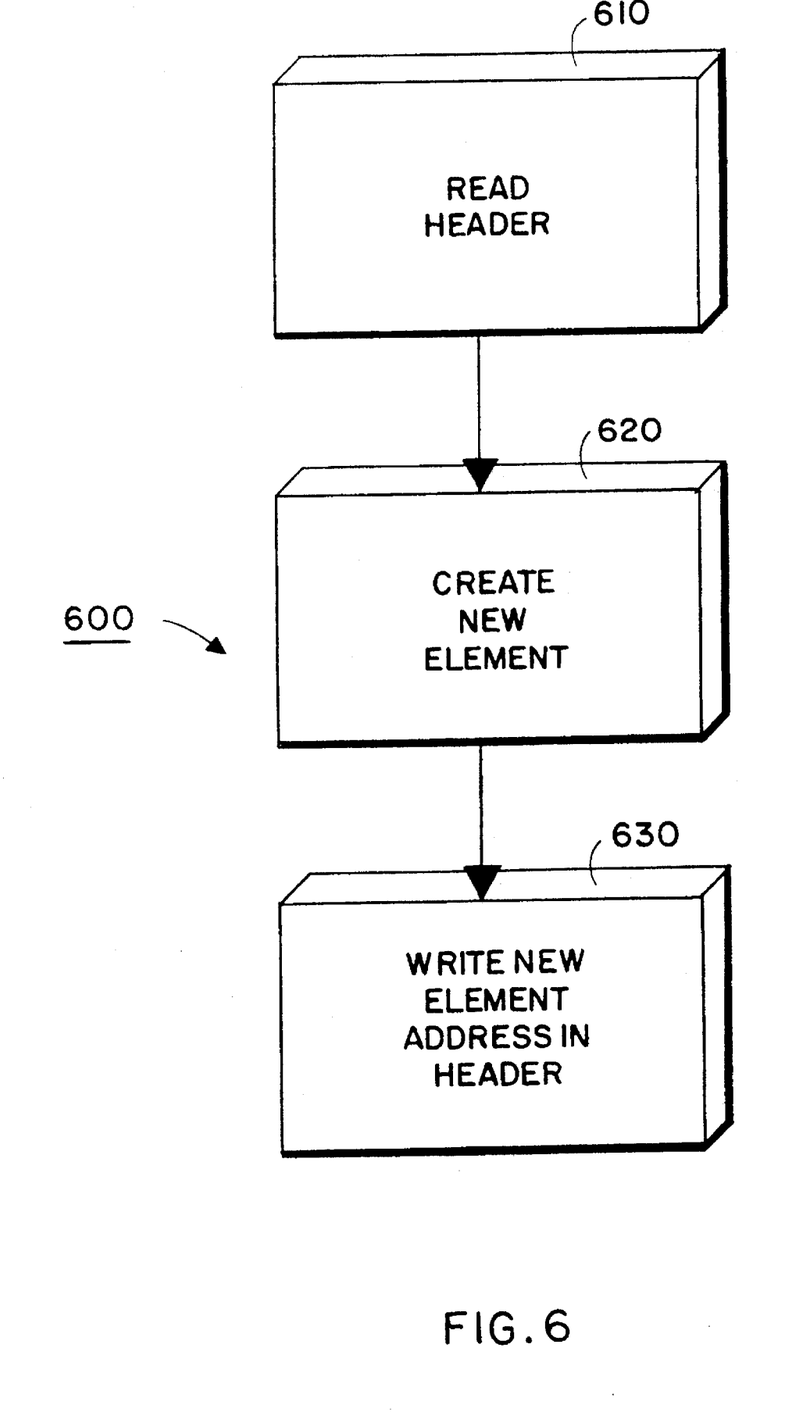
FIG. 6 is a flow diagram of a procedure to add an element to the queue according to the invention.

FIG. 6 shows a process 600 which can be used by a node adding a new element to the queue 300. In step 610, the header 310 is read to determine the address of the first element. In step 620, the new element is created, with the pointer field 352 containing the address read from the header 310 in step 610. In step 630, the address of the new element 362 is written to the header 310. All the steps of the procedure 600 are performed without synchronization, but with the knowledge that no other node is adding elements to the queue.

Figure 7:
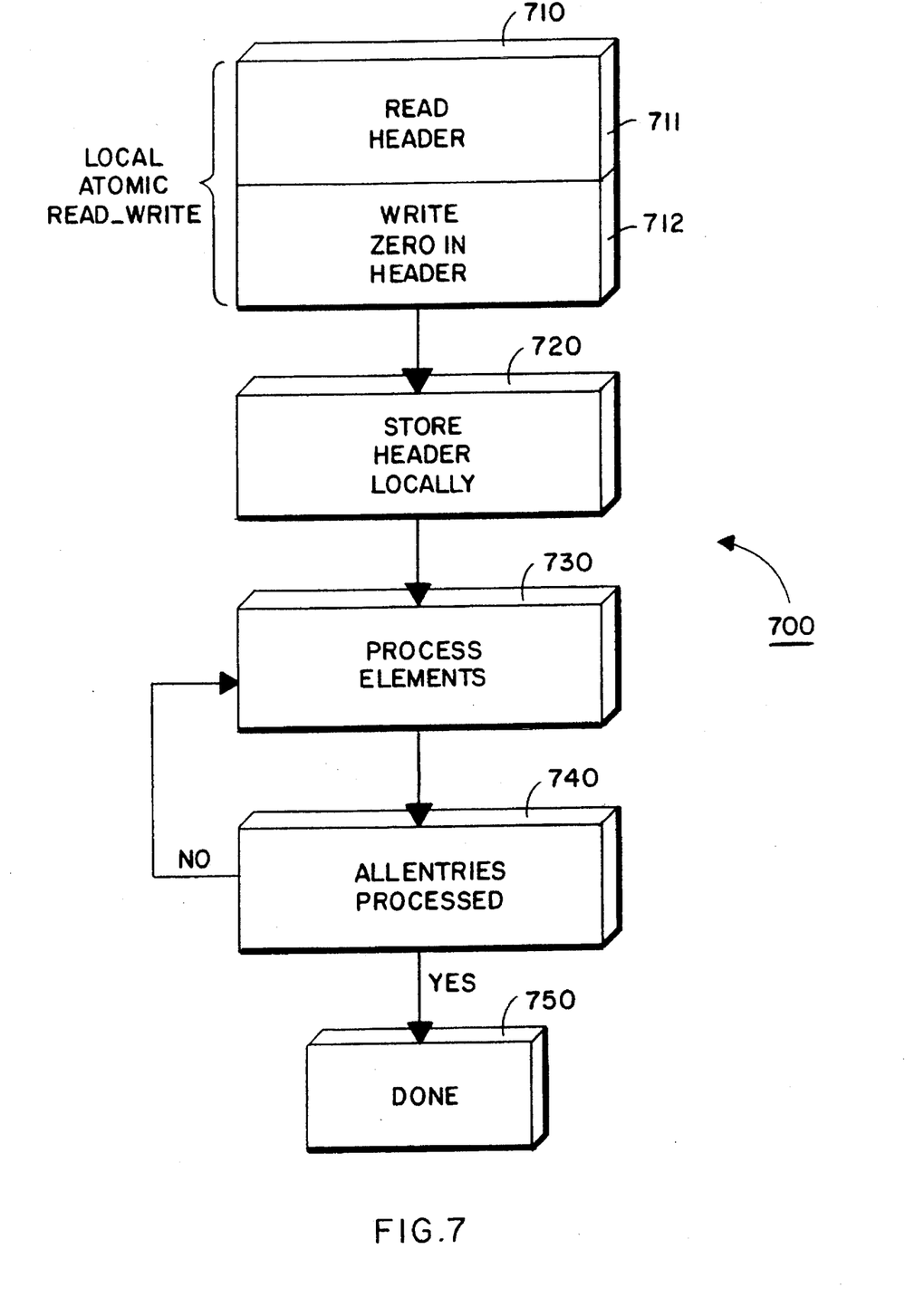
FIG. 7 is a block diagram of a procedure for processing queue elements according to the invention.

FIG. 7 shows a process 700 which can be used by a node processing elements of the queue 300. In atomic step 710, the processing node performs a local atomic read-write operation to read the header 310, and then effectively disables the header 310 by storing a zero in the header 310. A local atomic operation is performed to ensure that the header 310 is not overwritten by another node in between the sub-step 711 when the header 310 is read, and the sub-step 712 when the header 310 is over-written with a zero.

Figure 8:
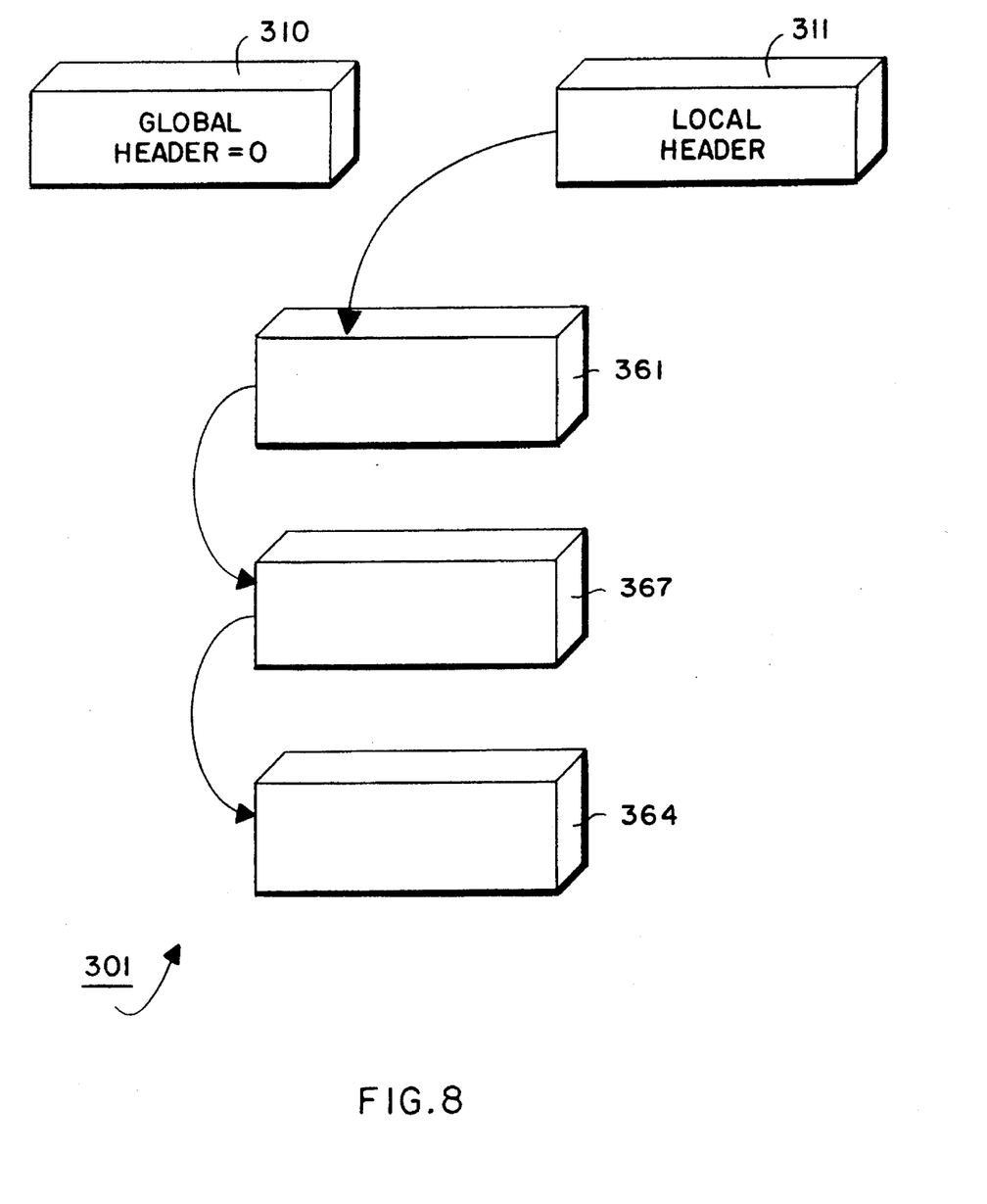
FIG. 8 is a block diagram of a queue being processed.

Note, that the local modification of the queue 300 leaves two different views of the header 310. The local node will see a zero in the header 310, while the node adding the new element, as shown in FIG. 8, views the header 310 unchanged, e.g., containing the address of the first element 361 before the new element 362 was added. Thus, should additional new elements by later added, they may include addresses in the their pointer fields 352 pointing to elements which have already been processed.

In step 720, the address read from the header 310 in step 710 can be stored in a local header 311 of the processing node. This step essentially links the elements to form a local queue 301 as shown in FIG. 8.

In step 730, the elements, now in the local queue 311, are processed as indicated in the data fields 353 of the elements. After each element has been successfully processed, the valid/invalid field 351 of the element is marked as invalid by a global modification.

The challenge is in detecting a last element of the queue to determine that the set of elements of the queue have all been processed, in step 740 of FIG. 7. It should be noted that there is no explicit end marker in any of the fields of the elements. In fact, the queue can not include an explicitly marked last element, since nodes adding elements are never explicitly notified that an element has been processed and has been marked as invalid.

While the elements of the local queue 311 are being processed in step 730, two conditions may occur. First, the processing node may detect an element in the queue 311 which has an address in the pointer field 352 of a next element which is marked as invalid. This is an unambiguous indication that the last element of the queue has been reached, and processing is complete, step 750.

The other condition occurs when nodes other than the processing node add additional new elements to the queue, and one of the newly allocated elements, e.g. one of the available elements 361–369 of FIG. 3B, by chance, just happens to be addressed by the last element processed and marked as invalid. This is not a problem, the processing node simply continues processing the queue 311 until there are no more elements marked valid, in which case the processing node is done.

The technique is unique in that no explicit synchronization is performed while adding elements to the queue. The only synchronization while processing elements of the queue is the local atomic operation to disable the local view of the queue header to ensure that elements added to the queue globally are not lost while processing the queue.

Disclosed are illustrative embodiments of the invention described using specific terms and examples. It is to be understood that various other adaptations and modifications may be made within the spirit and scope of the invention. Therefore, it is the object of the appended claims to cover all such variations and modifications as come within the true spirit and scope of the invention.

The invention claimed is:

1. In a computer system, a method for synchronizing modification of a common data structure stored in an asymmetric reflective memory shared by a plurality of processors, comprising:

in a first processor, storing a queue element in a global write-only address space of the asymmetric reflective memory, the asymmetric reflective memory to copy the queue element to a local read/write address space of a second processor, the queue element storing common data to be shared by the plurality of processors;

in the first processor, storing a queue header in the global write-only address space, the asymmetric reflective memory to copy the queue header to the local read/write address space of the second processor;

in the second processor, in response to detecting the queue element, reading the queue header and disabling the queue header, the reading and disabling performed atomically in the local read/write address space of the second processor;

in the second processor, processing the common data stored in the queue element; and in the second processor, marking the queue element as processed in the global address space of the asymmetric reflective memory, the asymmetric reflective memory to copy the queue element to a local read/write address space of the first processor after marking.

2. The method of claim 1 wherein the queue element includes a valid/invalid field, an address field, and a data field, the valid/invalid field for indicating a processing state of the common data stored in the queue element, the data field for storing the common data and wherein the step of marking further comprises:

writing an invalid flag in the valid/invalid field of the queue element, and wherein the step of disabling the queue header includes writing a zero in the queue header.

3. The method of claim 2 further comprising:

determining if the address field of the queue element points to a subsequent queue element having a valid flag in a corresponding valid/invalid field; and in response to detecting the valid flag, processing the subsequent queue element.

4. An apparatus for synchronizing modification of a common data structure shared by a plurality of processors, comprising:

an asymmetric reflective memory having a global write-only address space shared by the plurality of processors and a local read/write address space for each of the plurality of processors;

a queue element stored in the global write-only address space of the asymmetric reflective memory by a first processor, the asymmetric reflective memory to copy the queue element to the local read/write address space of a second processor the queue element storing common data to be shared by the plurality of processors;

a queue header stored in the global write-only address space of the asymmetric reflective memory by the first processor, the asymmetric reflective memory to copy the queue header to the local read/write address space of the second processor;

in response to detecting the queue element, means for reading the queue header and writing a zero in the queue header, the means for reading and writing the queue header performing the reading and writing steps atomically in the local read/write address space of the second processor;

means for processing the common data stored in the queue element; and means for marking the queue element as processed in the global address space.

5. The apparatus of claim 4 wherein the queue element includes a valid/invalid field, an address field and a data field, the valid/invalid field for indicating a processing state of the common data stored in the queue element, the data field for storing the common data and further comprising, the data field for storing the common data:

means for marking the valid/invalid field as valid to detect the queue element; and means for marking the valid/invalid field as invalid to indicate that the queue element has been processed.

6. The apparatus of claim 5 further comprising:

means for detecting if the address field of the queue element points at a subsequent queue element having a corresponding valid/invalid field marked as valid;

means for processing the subsequent queue element if the corresponding valid/invalid field is marked as valid.

7. In a computer system, a method for synchronizing modification of a queue, the queue including a header and queue elements, the queue stored in a memory shared by a plurality of processors, comprising:

writing a new queue element in a global write-only address space of an asymmetric reflective memory, the queue element storing common data to be shared by the plurality of processors, the asymmetric reflective memory copying the new queue element to a local read/write address space of the asymmetric reflective memory, the local read/write address space accessible by a second processor;

writing an address of the new queue element in the queue header, the queue header stored in the global write-only address space;

detecting the new queue element by the second processor;

reading the queue header and writing a zero in the queue header, the reading and writing of the queue header performed atomically in the local read/write address space of the second processor;

processing the common data stored in the new queue element by the second processor; and marking the new queue element as processed in the global address space of the asymmetric reflective memory.

* * * * *